(12) United States Patent
Huang et al.

(10) Patent No.: US 8,182,892 B2
(45) Date of Patent: May 22, 2012

(54) SUBSTRATE STRUCTURES APPLIED IN FLEXIBLE ELECTRICAL DEVICES AND FABRICATION METHOD THEREOF

(75) Inventors: Yueh-Chuan Huang, Hsinchu County (TW); Chyi-Ming Leu, Hsinchu County (TW); Tien-Shou Shieh, Taipei (TW); Chi-Fu Tseng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 178 days.

(21) Appl. No.: 12/629,019

(22) Filed: Dec. 1, 2009

(65) Prior Publication Data
US 2011/0027551 A1 Feb. 3, 2011

(30) Foreign Application Priority Data
Aug. 3, 2009 (TW) .............................. 98126043 A

(51) Int. Cl.
*B32B 9/00* (2006.01)
*B32B 33/00* (2006.01)
*B32B 7/02* (2006.01)
*B05D 5/06* (2006.01)

(52) U.S. Cl. ........ 428/40.1; 428/41.8; 428/98; 428/212; 428/220

(58) Field of Classification Search ................. 428/40.1, 428/41.8, 42.1, 98, 212, 220
See application file for complete search history.

(56) References Cited

U.S. PATENT DOCUMENTS

| 7,444,733 | B2 | 11/2008 | Ho et al. | |
| 7,466,390 | B2 | 12/2008 | French et al. | |
| 2002/0134497 | A1* | 9/2002 | Roth | .............................. 156/249 |
| 2005/0249909 | A1* | 11/2005 | Morishima et al. | .......... 428/40.1 |
| 2006/0254704 | A1 | 11/2006 | Seo et al. | |
| 2008/0176477 | A1 | 7/2008 | Hwang et al. | |

FOREIGN PATENT DOCUMENTS
WO  WO 2007/108659  9/2007
* cited by examiner

*Primary Examiner* — Patricia Nordmeyer

(57) ABSTRACT

A substrate structure applied in flexible electrical devices is provided. The substrate structure includes a carrier, a flexible substrate opposed to the carrier, a release layer formed on a surface of the flexible substrate opposed to the carrier, and an adhesive layer formed between the carrier, the release layer and the flexible substrate, wherein the area of the adhesive layer is larger than that of the release layer, and the adhesive layer has a greater adhesion force than that of the release layer to the flexible substrate. The invention also provides a method for fabricating the substrate structure.

12 Claims, 5 Drawing Sheets

SUBSTRATE STRUCTURES APPLIED IN FLEXIBLE ELECTRICAL DEVICES AND FABRICATION METHOD THEREOF

CROSS REFERENCE TO RELATED APPLICATIONS

This application claims priority of Taiwan Patent Application No. 98126043, filed on Aug. 3, 2009, the entirety of which is incorporated by reference herein.

BACKGROUND OF THE INVENTION

1. Field of the Invention

The invention relates to a substrate structure, and more particularly to a substrate structure applied in flexible electrical devices and fabrication method thereof.

2. Description of the Related Art

A flexible display is a development trend for new-generation displays, particularly an active flexible display. Compared to conventional heavy glass substrate with brittleness, development of light flexible plastic substrate is desirable, especially active full-color TFT display panel. Currently, fabrication techniques of active flexible display comprise a-Si TFT, LPTS TFT and OTFT. Display mediums comprise EPD, ECD, LCD and EL.

Fabrication processes are divided into batch type and roll to roll. A TFT apparatus can utilize batch type fabrication processes. However, development of substrate transfer and film separation techniques is required. The flexible display must be transferred to other plastic substrates from glass. For flexible displays using roll to roll fabrication processes, new apparatuses are required and some problems caused by rolling and contact must be overcome.

The batch-type fabrication process has three methods. A PES substrate is bonded to a silicon wafer. A 7" VGA (640× 480) plastic LCD is obtained by a low-temperature a-Si TFT technique. In this manner, a transparent substrate material with heat-resistant, low thermal expansion coefficient, low light hysteresis and chemical stability is required, and combined with proper gel materials and an advanced release technique (SEC Corporation). An LPTS TFT back cover is fabricated on glass. The back cover is then removed from glass by laser annealing. The transfer technique plays an important role for this method. In the transfer technique, TFT devices with superior properties can be obtained due to no limitations by plastic substrates concerning fabrication temperature so that conventional transparent plastic substrate can be utilized (Seiko Epson Corporation). Polyimide is coated on glass to develop an a-Si TFT-EPD display. The polyimide substrate is then taken off from the glass by the transfer technique. When the polyimide substrate is directly coated on glass, the fabrication temperature is permitted to achieve 300° C. and above due to heat-resistant thereof. However, using laser annealing to remove glass substrate is also required (Philips Corporation).

BRIEF SUMMARY OF THE INVENTION

One embodiment of the invention provides a substrate structure applied in flexible electrical devices comprising a carrier, a flexible substrate opposed to the carrier, a release layer formed on a surface of the flexible substrate opposed to the carrier, and an adhesive layer formed between the carrier, the release layer and the flexible substrate, wherein the area of the adhesive layer is larger than that of the release layer, and the adhesive layer has a greater adhesion force than that of the release layer to the flexible substrate.

One embodiment of the invention provides a method for fabricating a substrate structure applied in flexible electrical devices comprising providing a carrier, providing a flexible substrate opposed to the carrier, forming a release layer on a surface of the flexible substrate opposed to the carrier, and immobilizing the flexible substrate and the release layer on the carrier using an adhesive layer, wherein the area of the adhesive layer is larger than that of the release layer, and the adhesive layer has a greater adhesion force than that of the release layer to the flexible substrate.

The step of immobilizing the flexible substrate and the release layer on the carrier comprises coating the adhesive layer on the carrier and combining the carrier with the release layer and the flexible substrate using the adhesive layer, or coating the adhesive layer on surfaces of the release layer and the flexible substrate opposed to the carrier and combining the flexible substrate and the release layer with the carrier using the adhesive layer.

A substrate structure applied in for example flexible electrical devices is provided by the invention. The substrate structure comprises a flexible substrate, a release layer, an adhesive layer and a carrier. The feature of the invention is that the adhesive layer has a greater adhesion force than that of the release layer to the flexible substrate to ensure that the flexible substrate is immobilized on the carrier during subsequent processes and does not peel off and separate from the carrier after such processes are completed. In the invention, the processes performed on the carrier can be performed on the flexible substrate, wherein transfer of the processes is easily accomplished and precise pixels are fabricated on the flexible substrate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
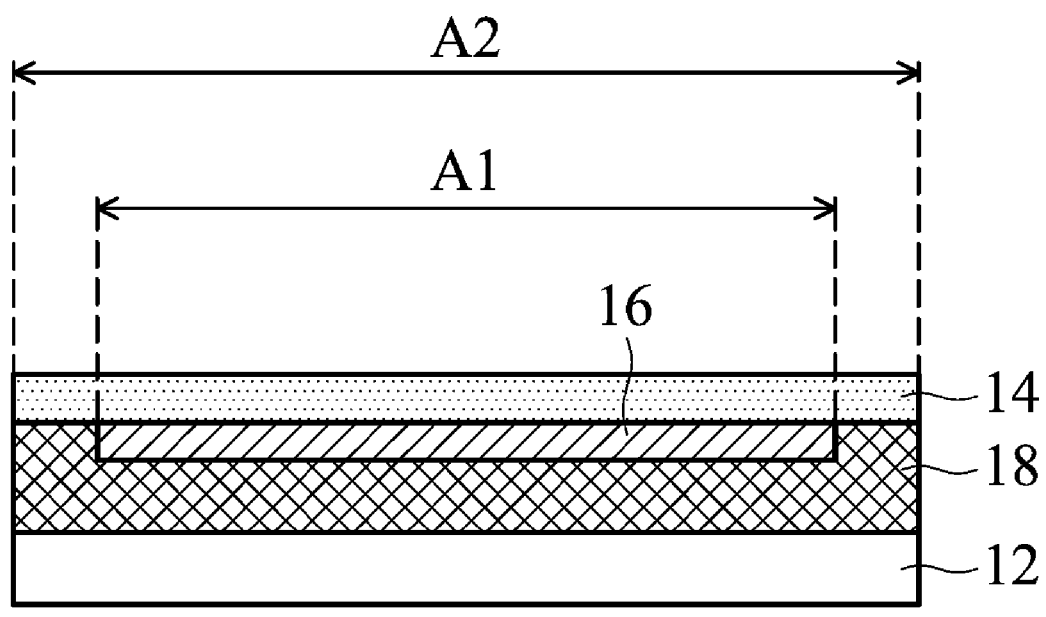
FIG. 1 is a cross-sectional view of a substrate structure applied in flexible electrical devices according to an embodiment of the invention.

In an embodiment, a substrate structure applied in flexible electrical devices of the invention is shown in FIG. 1. The substrate structure 10 comprises a carrier 12, a flexible substrate 14, a release layer 16 and an adhesive layer 18. The flexible substrate 14 is opposed to the carrier 12. The release layer 16 is formed on a surface of the flexible substrate 14 opposed to the carrier 12 with a first area A1. The adhesive layer 18 is formed between the carrier 12, and the release layer 16 with a second area A2. Specifically, the second area A2 is larger than the first area A1 and the adhesive layer 18 has a greater adhesion force than that of the release layer 16 to the flexible substrate 14.

The carrier 12 may comprise glass or silicon wafer.

The flexible substrate 16 may be a flexible display substrate, for example an active flexible display substrate. The flexible substrate 16 may comprise polymer materials such as polyimide (PI), polycarbonate (PC), polyethersulfone (PES), polyacrylate (PA), polynorbornene (PNB), polyethylene terephthalate (PET), polyetheretherketone (PEEK), polyethylene naphthalate (PEN) or polyetherimide (PEI), or metal materials.

The release layer 16 may comprise parylene or cyclic olefin copolymers (COC). The adhesion force of the release layer 16 to the flexible substrate 14 is 0 B.

The adhesive layer 18 may comprise UV curable resins, heat curable resins or UV and heat curable resins, for example, acrylic resins, epoxy resins, acrylic resin-modified epoxy resins, polyurethane resins, siloxane resins, polyamide resins, ketone-aldehyde resins, phenolic resins, furan resins, urea-formaldehyde resins or combinations thereof. The adhesion force of the adhesive layer 18 to the flexible substrate 14 is 1-5 B.

In accordance with various flexible substrates, a proper adhesive layer with a melting point exceeding the glass transition temperature (Tg) of the flexible substrate is selected to prevent the adhesive layer from melting during subsequent high temperature processes, which would deform the substrate structure. For example, when a PET flexible substrate is utilized, an adhesive layer with a melting point exceeding 120° C. is allowed. When a PEN flexible substrate is utilized, an adhesive layer with a melting point exceeding 150° C. is allowed.

Figure 2A:
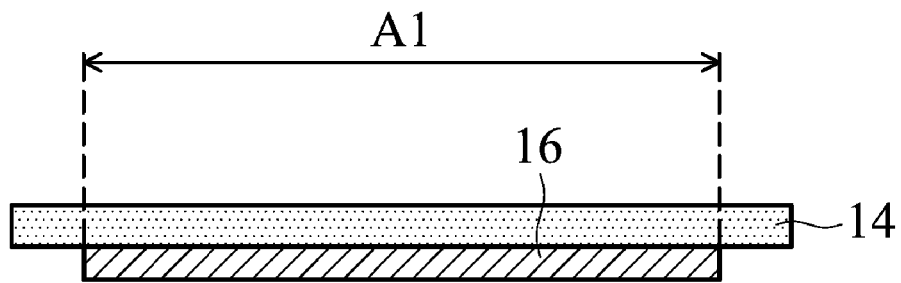
FIGS. 2A-2C are cross-sectional views of a method for fabricating a substrate structure applied in flexible electrical devices according to an embodiment of the invention.
Figure 2B:
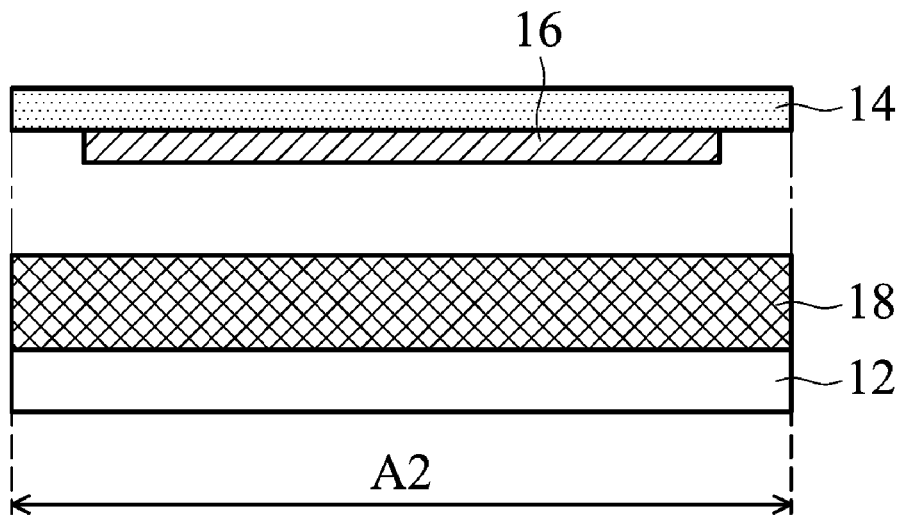
Figure 2C:
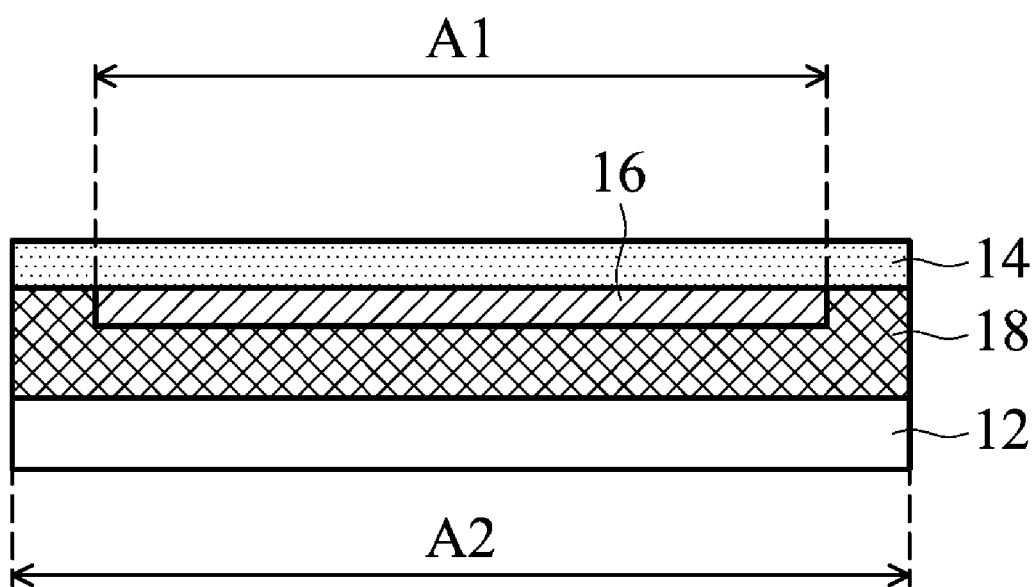

In an embodiment, a method for fabricating a substrate structure applied in flexible electrical devices of the invention is shown in FIGS. 2A-2C.

Referring to FIG. 2A, a flexible substrate 14 is provided. A release layer 16 is then formed on a surface of the flexible substrate 14 with an area A1 by, for example, a coating or evaporation process.

Next, referring to FIG. 2B, a carrier 12 opposed to the flexible substrate 14 and the release layer 16 is provided. An adhesive layer 18 is then formed on the carrier 12 with an area A2 by a process, such as a coating process.

Next, referring to FIG. 2C, the carrier 12 is combined with the release layer 16 and the flexible substrate 14 using the adhesive layer 18 to immobilize the flexible substrate 14 and the release layer 16 on the carrier 12. Specifically, the area A2 is larger than the area A1 and the adhesive layer 18 has a greater adhesion force than that of the release layer 16 to the flexible substrate 14.

Figure 3A:
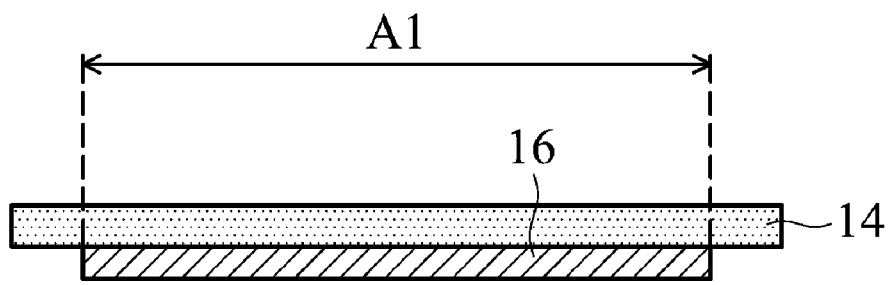
FIGS. 3A-3C are cross-sectional views of a method for fabricating a substrate structure applied in flexible electrical devices according to an embodiment of the invention.
Figure 3B:
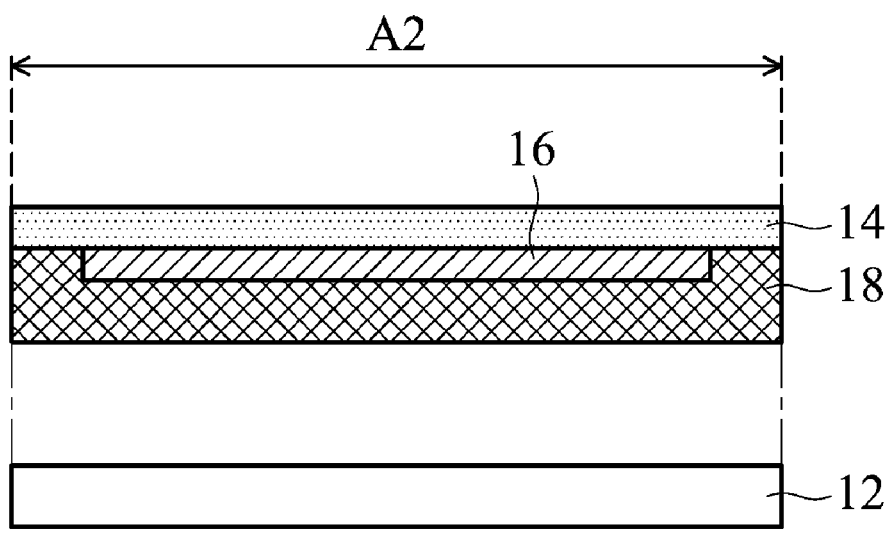
Figure 3C:
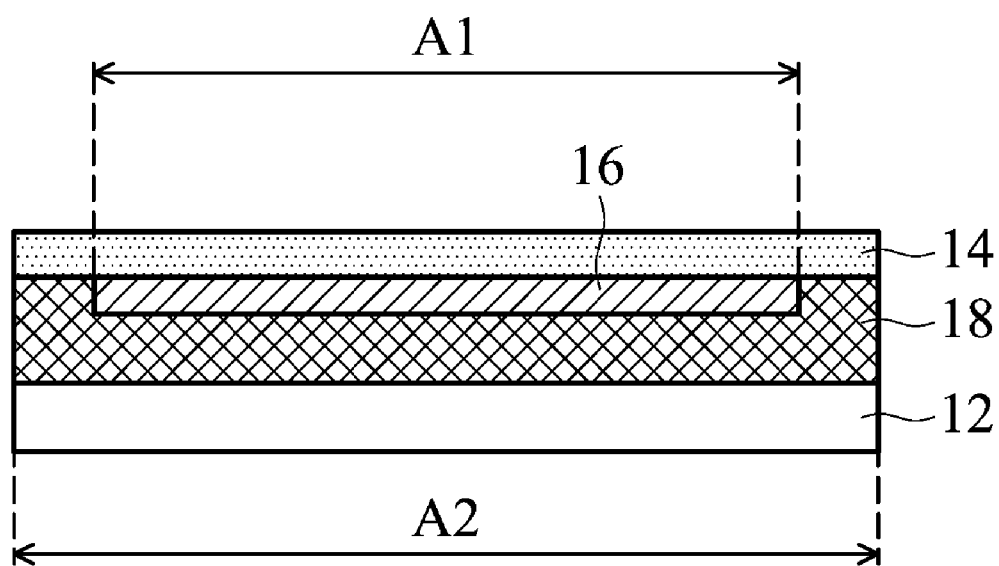

In an embodiment, a method for fabricating a substrate structure applied in flexible electrical devices of the invention is shown in FIGS. 3A-3C.

Referring to FIG. 3A, a flexible substrate 14 is provided. A release layer 16 is then formed on a surface of the flexible substrate 14 with an area A1 by, for example, coating or evaporation.

Next, referring to FIG. 3B, a carrier 12 opposed to the flexible substrate 14 and the release layer 16 is provided. An adhesive layer 18 is then formed on surfaces of the release layer 16 and the flexible substrate 14 opposed to the carrier 12 with an area A2 by a process, such as a coating process.

Next, referring to FIG. 3C, the release layer 16 and the flexible substrate 14 are combined with the carrier 12 using the adhesive layer 18 to immobilize the flexible substrate 14 and the release layer 16 on the carrier 12. Specifically, the area A2 is larger than the area A1 and the adhesive layer 18 has a greater adhesion force than that of the release layer 16 to the flexible substrate 14.

The flexible substrate 14 is easily separated from the carrier 12 by cutting along two ends or internal sides of the release layer 16.

The substrate structure applied in flexible electrical devices provided by the invention is easily fabricated using present semiconductor technologies, having various adhesion forces of the release layer and the adhesive layer to the flexible substrate. The release layer with lower adhesion force is first formed on the flexible substrate with a smaller area. The adhesive layer with greater adhesion force is then formed on the release layer and the flexible substrate with a larger area. The release layer and the flexible substrate are then pasted on the carrier using the adhesive layer. According to the fabrication method, during TFT processes, the flexible substrate does not peel off from the carrier. The flexible substrate can be simply separated from the carrier by cutting along the two ends of the release layer.

Example 1

Preparation of an Epoxy Adhesive Layer 185 g of EPON 828 (bisphenol A epoxy resin, epoxy equivalent: 185-210, purchased from Shell Chemical), 79.99 g of acrylic acid (Mw: 72.06, purchased from TCI), 0.34 g of 2,2'-methylenebis(4-methyl-6-tert-butylphenol) (thermal inhibitor, purchased from SHOWA) and 3.93 g of triphenyl phosphine (catalyst, purchased from Lancaster) were mixed in a 1 L reaction bottle. The reaction bottle was then placed in a oil bath with a stirring rate of 200 rpm, a reaction temperature of 105° C.±5° C., a condenser temperature of 9° C. and a total reaction time of 5-6 hours to prepare an oligomer.

Next, 40 g of the oligomer, 60 g of ECN-1299 (o-cresol Novolac epoxy resin, epoxy equivalent: 217-244, purchased from Ciba Geigy) and 142.8 g of (1-Methoxy-2-propyl) acetate were mixed in a reaction bottle and mechanically stirred in a 90° C. oil bath. After cooling the oil bath to 50° C., 1.25 phr of IRGACURE 184 (1-hydroxycyclohexyl phenyl ketone, free radical initiator, purchased from Ciba) and 1.25 phr of IRGACURE 819 (bis(2,4,6-trimethylbenzoyl)-phenylphosphineoxide, free radical initiator, purchased from Ciba) were added. After cooling to room temperature, 20 phr of talc filler (diameter: 3-5 μm) and 5 phr of dicyandiamide (heat curable agent, diameter: 3 μm) were added and uniformly stirred. The results were grinded twice using a three-cylinder grinder. Thus, preparing an epoxy adhesive layer.

Example 2

Preparation of a PEN/Parylene/Epoxy/Glass Substrate Structure

Parylene was plated on a PEN substrate (10 cm×10 cm) to an area of 8 cm×8 cm and a thickness of 300 nm. An epoxy adhesive layer was then coated on a glass (10 cm×10 cm) to a thickness of 100 μm and pre-baked at 80° C. for 20 minutes. The PEN substrate plated with parylene was pasted on the glass coated with the epoxy adhesive layer using a pressing machine. After baking at 150° C. for 60 minutes, the PEN/parylene/epoxy/glass substrate structure was prepared.

Separation Test

After cutting an area of 7.5 cm×7.5 cm using a blade, the PEN substrate was easily separated from the glass, as shown in Table 1.

Example 3

Preparation of a PEN/Parylene/Epoxy/Glass Substrate Structure

Parylene was plated on a PEN substrate (10 cm×10 cm) to an area of 8 cm×8 cm and a thickness of 300 nm. An epoxy adhesive layer was then coated on the PEN substrate plated with parylene to a thickness of 100 μm and pre-baked at 80° C. for 20 minutes. The PEN substrate plated with parylene and coated with the epoxy adhesive layer was pasted on a glass using a pressing machine. After baking at 150° C. for 60 minutes, the PEN/parylene/epoxy/glass substrate structure was prepared.

Separation Test

After cutting an area of 7.5 cm×7.5 cm using a blade, the PEN substrate was easily separated from the glass, as shown in Table 1.

Example 4

Preparation of a PEN/Zeonor/Epoxy/Glass Substrate Structure

Zeonor was dissolved in xylene to prepare a 3 wt % Zeonor solution. The Zeonor solution was then coated on a PEN substrate (10 cm×10 cm) to an area of 8 cm×8 cm and a thickness of 50 μm using a scraper and respectively baked at 50° C. and 120° C. for 5 minutes. An epoxy adhesive layer was then coated on a glass (10 cm×10 cm) to a thickness of 100 μm and pre-baked at 80° C. for 20 minutes. The PEN substrate coated with Zeonor was pasted on the glass coated with the epoxy adhesive layer using a pressing machine. After baking at 150° C. for 60 minutes, the PEN/Zeonor/epoxy/glass substrate structure was prepared.

Separation Test

After cutting an area of 7.5 cm×7.5 cm using a blade, the PEN substrate was easily separated from the glass, as shown in Table 1.

Example 5

Preparation of a PEN/Zeonor/Epoxy/Glass Substrate Structure

Zeonor was dissolved in xylene to prepare a 3 wt % Zeonor solution. The Zeonor solution was then coated on a PEN substrate (10 cm×10 cm) to an area of 8 cm×8 cm and a thickness of 100 μm using a scraper and respectively baked at 50° C. and 120° C. for 5 minutes. An epoxy adhesive layer was then coated on the PEN substrate coated with Zeonor to a thickness of 100 μm and pre-baked at 80° C. for 20 minutes. The PEN substrate coated with Zeonor and the epoxy adhesive layer was pasted on a glass using a pressing machine. After baking at 150° C. for 60 minutes, the PEN/Zeonor/epoxy/glass substrate structure was prepared.

Separation Test

After cutting an area of 7.5 cm×7.5 cm using a blade, the PEN substrate was easily separated from the glass, as shown in Table 1.

Example 6

Preparation of a PET/Parylene/Epoxy/Glass Substrate Structure

Parylene was plated on a PET substrate (10 cm×10 cm) to an area of 8 cm×8 cm and a thickness of 300 nm. An epoxy adhesive layer was then coated on a glass (10 cm×10 cm) to a thickness of 100 μm. The PET substrate plated with parylene was pasted on the glass coated with the epoxy adhesive layer using a pressing machine. After baking at 100° C. for 60 minutes, the PET/parylene/epoxy/glass substrate structure was prepared.

Separation Test

After cutting an area of 7.5 cm×7.5 cm using a blade, the PET substrate was easily separated from the glass, as shown in Table 1.

Example 7

Preparation of a PET/Parylene/Epoxy/Glass Substrate Structure

Parylene was plated on a PET substrate (10 cm×10 cm) to an area of 8 cm×8 cm and a thickness of 300 nm. An epoxy adhesive layer was then coated on the PET substrate plated with parylene to a thickness of 100 μm. The PET substrate plated with parylene and coated with the epoxy adhesive layer was pasted on a glass using a pressing machine. After baking at 100° C. for 60 minutes, the PET/parylene/epoxy/glass substrate structure was prepared.

Separation Test

After cutting an area of 7.5 cm×7.5 cm using a blade, the PET substrate was easily separated from the glass, as shown in Table 1.

Comparative Example 1

Preparation of a PEN/Epoxy/Glass Substrate Structure

An epoxy adhesive layer was coated on a PEN substrate (10 cm×10 cm) to a thickness of 100 μm and pre-baked at 80° C. for 20 minutes. The PEN substrate coated with the epoxy adhesive layer was pasted on a glass using a pressing machine. After baking at 150° C. for 60 minutes, the PEN/epoxy/glass substrate structure was prepared.

Separation Test

After cutting an area of 7.5 cm×7.5 cm using a blade, the PEN substrate was not separated from the glass, as shown in Table 1.

TABLE 1

| Examples | Flexible substrate | Release layer | Adhesive layer thickness/substrate | Pasting conditions | Test results |
| --- | --- | --- | --- | --- | --- |
| Example 2 | PEN | Parylene | 100 μm/glass | 80° C./20 min<br>150° C./60 min | Pasting well, separation test is OK |

TABLE 1-continued

| Examples | Flexible substrate | Release layer | Adhesive layer thickness/substrate | Pasting conditions | Test results |
|---|---|---|---|---|---|
| Example 3 | PEN | Parylene | 100 μm/parylene/PEN | 80° C./20 min 150° C./60 min | Pasting well, separation test is OK |
| Example 4 | PEN | Zeonor | 100 μm/glass | 80° C./20 min 150° C./60 min | Pasting well, separation test is OK |
| Example 5 | PEN | Zeonor | 100 μm/Zeonor/PEN | 80° C./20 min 150° C./60 min | Pasting well, separation test is OK |
| Example 6 | PET | Parylene | 100 μm/glass | 100° C./60 min | Pasting well, separation test is OK |
| Example 7 | PET | Parylene | 100 μm/parylene/PET | 100° C./60 min | Pasting well, separation test is OK |
| Comparative Example 1 | PEN | none | 100 μm/PEN | 80° C./20 min 150° C./60 min | Pasting well, separation test is failed |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate structure applied in flexible electrical devices, comprising:
   a carrier;
   a flexible substrate opposed to the carrier;
   a release layer formed on a surface of the flexible substrate and between the carrier and the flexible substrate; and
   an adhesive layer formed between and contacting the carrier and the flexible substrate, wherein the release layer is embedded in the adhesive layer, the area of the adhesive layer is larger than that of the release layer, and the adhesive layer has a greater adhesion force than that of the release layer to the flexible substrate.

2. The substrate structure applied in flexible electrical devices as claimed in claim 1, wherein the adhesion force of the release layer to the flexible substrate is 0 B.

3. The substrate structure applied in flexible electrical devices as claimed in claim 1, wherein the adhesion force of the adhesive layer to the flexible substrate is 1-5 B.

4. The substrate structure applied in flexible electrical devices as claimed in claim 1, wherein the carrier comprises glass or silicon wafer.

5. The substrate structure applied in flexible electrical devices as claimed in claim 1, wherein the flexible substrate comprises polyimide (PI), polycarbonate (PC), polyethersulfone (PES), polyacrylate (PA), polynorbornene (PNB), polyethylene terephthalate (PET), polyetheretherketone (PEEK), polyethylene naphthalate (PEN), polyetherimide (PEI) or metal.

6. The substrate structure applied in flexible electrical devices as claimed in claim 1, wherein the release layer comprises parylene or cyclic olefin copolymers (COC).

7. The substrate structure applied in flexible electrical devices as claimed in claim 1, wherein the adhesive layer comprises UV curable resins, heat curable resins or UV and heat curable resins.

8. The substrate structure applied in flexible electrical devices as claimed in claim 7, wherein the adhesive layer comprises acrylic resins, epoxy resins, acrylic resin-modified epoxy resins, polyurethane resins, siloxane resins, polyamide resins, ketone-aldehyde resins, phenolic resins, furan resins, urea-formaldehyde resins or combinations thereof.

9. A method for fabricating the substrate structure applied in flexible electrical devices of claim 1, comprising:
   providing a carrier;
   providing a flexible substrate opposed to the carrier;
   forming a release layer on a surface of the flexible substrate and between the carrier and the flexible substrate; and
   immobilizing the flexible substrate and the release layer on the carrier using an adhesive layer, wherein the adhesive layer contacts the carrier and the flexible substrate, the release layer is embedded in the adhesive layer, the area of the adhesive layer is larger than that of the release layer, and the adhesive layer has a greater adhesion force than that of the release layer to the flexible substrate.

10. The method for fabricating a substrate structure applied in flexible electrical devices as claimed in claim 9, wherein the release layer is formed on the surface of the flexible substrate by coating or evaporation.

11. The method for fabricating a substrate structure applied in flexible electrical devices as claimed in claim 9, wherein the step of immobilizing the flexible substrate and the release layer on the carrier comprises coating the adhesive layer on the carrier and combining the carrier with the release layer and the flexible substrate using the adhesive layer.

12. The method for fabricating a substrate structure applied in flexible electrical devices as claimed in claim 9, wherein the step of immobilizing the flexible substrate and the release layer on the carrier comprises coating the adhesive layer on surfaces of the release layer and the flexible substrate opposed to the carrier and combining the flexible substrate and the release layer with the carrier using the adhesive layer.

\* \* \* \* \*